(12) United States Patent
Navarra Pruna

(10) Patent No.: US 12,384,080 B2
(45) Date of Patent: Aug. 12, 2025

(54) SLIDE ASSEMBLY FOR INJECTION MOLDS

(71) Applicant: COMERCIAL DE UTILES Y MOLDES, S.A., Sant Just Desvern (ES)

(72) Inventor: Alberto Navarra Pruna, Sant Just Desvern (ES)

(73) Assignee: COMERCIAL DE UTILES Y MOLDES, S.A., Sant Just Desvern (ES)

( * ) Notice: Subject to any disclaimer, the term of this patent is extended or adjusted under 35 U.S.C. 154(b) by 138 days.

(21) Appl. No.: 18/168,780

(22) Filed: Feb. 14, 2023

(65) Prior Publication Data

US 2023/0256658 A1 Aug. 17, 2023

(30) Foreign Application Priority Data

Feb. 16, 2022 (ES) .................................. 202230121

(51) Int. Cl.
| | |
|---|---|
| *B29C 45/33* | (2006.01) |
| *B29C 33/32* | (2006.01) |
| *B29C 33/40* | (2006.01) |
| *B29C 45/26* | (2006.01) |

(52) U.S. Cl.
CPC ............ *B29C 45/332* (2013.01); *B29C 33/32* (2013.01); *B29C 45/2675* (2013.01); *B29C 33/40* (2013.01)

(58) Field of Classification Search
CPC ..... B29C 45/33; B29C 45/332; B29C 45/374; B29C 45/2675; B29C 45/4435; B29C 2045/338; B29C 2045/336; B29C 2045/363; B29C 33/22
See application file for complete search history.

(56) References Cited

U.S. PATENT DOCUMENTS

| | | | | |
|---|---|---|---|---|
| 5,137,442 A | * | 8/1992 | Starkey ............... | B29C 45/4435 425/444 |
| 2005/0098295 A1 | * | 5/2005 | Dubay .................. | B29C 45/332 164/312 |
| 2008/0124425 A1 | * | 5/2008 | Chen ..................... | B29C 45/332 425/545 |
| 2012/0251020 A1 | * | 10/2012 | Swei ..................... | F16C 33/205 428/327 |
| 2014/0106022 A1 | * | 4/2014 | Navarra Pruna ..... | B29C 45/332 425/589 |

FOREIGN PATENT DOCUMENTS

| | | | | |
|---|---|---|---|---|
| CN | 205522136 U | | 8/2016 | |
| CN | 212636452 U | | 3/2021 | |
| DE | 102013017793 A1 | * | 4/2015 | ........... B29C 45/332 |
| EP | 2716428 A1 | | 4/2014 | |
| JP | 109-314607 A | | 12/1997 | |
| JP | 2005-138419 A | | 6/2005 | |
| JP | 3936670 B2 | * | 6/2007 | |
| WO | 92/14596 A1 | | 9/1992 | |

* cited by examiner

*Primary Examiner* — Jerzi H Moreno Hernandez

(74) *Attorney, Agent, or Firm* — Knobbe, Martens, Olson & Bear, LLP

(57) ABSTRACT

A slide assembly for injection molds includes a closing wedge, a slide body provided with a hole for at least partially housing said closing wedge, and a figure insert coupled to the slide body. The figure insert in the use position is vertically and horizontally movable with respect to the slide body. The slide assembly is both economical and simple.

13 Claims, 4 Drawing Sheets

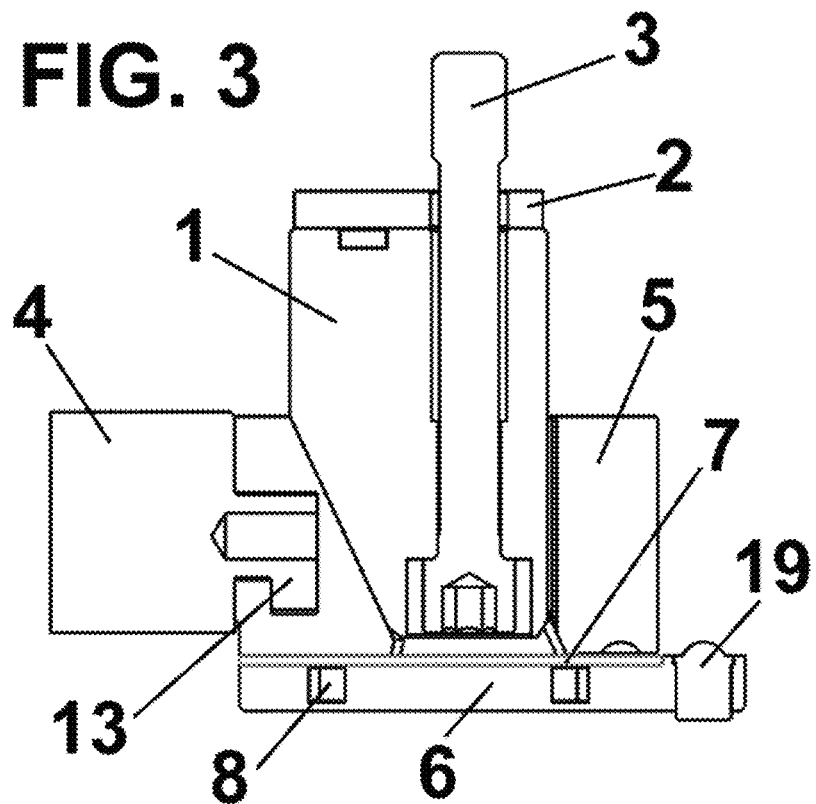
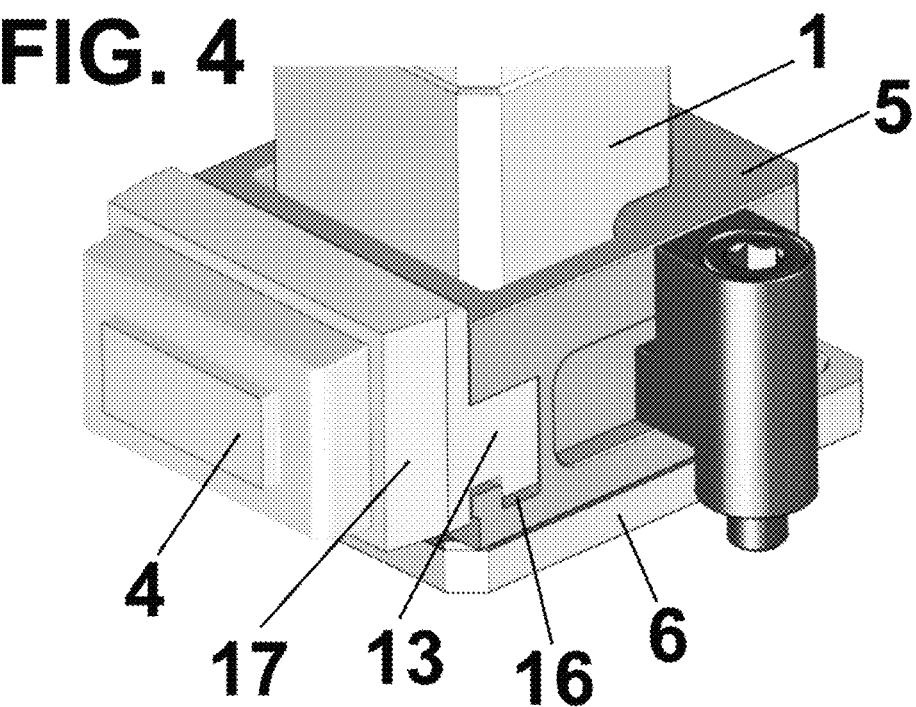

SLIDE ASSEMBLY FOR INJECTION MOLDS

CROSS-REFERENCE TO RELATED APPLICATION

This application claims priority to Spanish Patent Application No. P202230121 filed on Feb. 16, 2022, the disclosure of which including the specification, the drawings, and the claims is hereby incorporated by reference in its entirety.

FIELD OF THE INVENTION

The present invention relates to a slide assembly for injection molds.

BACKGROUND TO THE INVENTION

In the field of injection molds, slide assemblies are used to model on the sides of the product to be manufactured some figure shapes which, by the traditional system of the conventional mold, are impossible to reproduce, since they basically consist of a mold plate and a cavity plate, and only have a single opening movement which requires that all the machined parts are made to be demolded in the opening direction of the mold.

Molds that have to manufacture parts with shapes that cannot be demolded by conventional methods require the application of mechanisms called slides, which are responsible for transmitting displacements perpendicular to the opening of the mold during the opening and closing process, which allow the demolding of the aforementioned negatives perpendicularly during the opening of the mold and before the demolding of the injected product.

Thus, the slide itself must move on guides or rails that determine the path it must follow in each particular case to allow the demolding of the figure in question.

A drawback of these conventional slide assemblies is that they require a large number of components and machining that can be complicated and costly.

In addition, the need for inclined guides with protrusions to achieve the intended movements also hinders the free space, making it difficult to use robots to extract parts in order to automate the production system.

SUMMARY OF THE INVENTION

Therefore, the aim of the present invention is to provide a slide assembly for injection molds that is more economical and simpler.

The slide assembly for injection molds according to the present invention is defined in claim 1. Additional features of the slide assembly according to the present invention are described in the dependent claims.

The slide assembly according to the present invention comprises elements coordinated in such a way that it becomes a sliding unit to be installed on the mold plates, without requiring the classic hardened and precision-ground base guides to achieve perfect operation. Furthermore, it does not require the incorporation of inclined guides for sliding, nor any auxiliary mechanism to retain the slide during the ejection process.

The slide assembly only needs a recess in the punch plate where a magnetic sliding base is housed, formed, for example, by a stainless steel base, non-magnetic, where some properly polarized magnets are housed and where, by means of glue, a plate of antimagnetic sliding material is glued, forming a parallelepiped-shaped assembly with dimensions adapted to each slide model.

In addition, in a certain position, it incorporates a positioning ball which, pushed by a spring, serves as a positioner to fix the slide body when the mold is opened.

This magnetic base is positioned in the mold by its own gripping force and also guarantees the adhesion of the slide assembly during the entire working cycle. The incorporation of a slide stop in the assembly is only an additional guarantee that any malfunction in the mold will not lead to unintentional sliding of the slide.

The closing wedge incorporates an angled or inclined projection which forms a sliding ramp so that the slide assembly can slide with the opening and closing movement of the mold by means of the angular socket designed for this purpose, since during this movement the contact faces between the closing wedge and the slide body generate, due to the angle of inclination of both parts, the forward sliding of the slide body, which is generated at the moment of closing the mold, while the backward movement is generated by the same method at the moment of opening the mold.

The closing wedge also includes an adjustment plate that can be ground to the correct dimension so that, when the mold is closed, it exactly matches the bearing surface and the precise seal between the punch plate and the cavity plate. Only one screw is required to perfectly anchor the closing wedge in its housing in the cavity plate.

The slide body is a parallelepiped profile with an angular or inclined hole, where the closing wedge, which is part of this assembly, is slidably fitted.

The end of the slide body where the figure insert is to be installed includes a transverse hole or slot across the full width of the slide with an inverted L-shaped profile, where the tolerances in the longitudinal direction are equivalent to those used in any sliding system within the sector, while in the transverse direction they allow a slight displacement between the slot or hole in the slide body and a projection of the figure insert, when assembled.

Magnets duly housed in one side of the slot or L-shaped hole of the slide body will keep the mold insert in transverse contact thanks to their magnetic attraction. One side of this slide body has a groove that allows the slide stop installed in the mold not to be an obstacle to the sliding of the slide body. However, it is the lower part of this groove that allows the sliding stop to perform its function as an operational safety device.

The figure insert is a parallelepiped with certain dimensions that we can attach to the slide body by means of a transverse and inverted L-shaped projection that fits into the transverse slot or hole of the slide body, with the appropriate tolerances to achieve its own displacements.

The sliding stop is an element formed by means of a cylindrical bar of certain dimensions which longitudinally has a housing for a fixing screw. A lateral machining in a staggered form will form the projection that will serve as a support guide for the slide body when it is mounted in the mold.

The assembly between the slide body and the figure insert is carried out by machining both parts in the shape of an inverted L, which remain in a certain position thanks to the magnetic attraction of the magnets, and it is precisely this position which prevents friction between the figure insert and the mold cavity during movement, thus avoiding any possible friction that could generate imperfections and generate burrs in the injected part.

When assembling the two components, and due to the tolerances described in their machining, it is observed that, once fitted together, the two parts allow angular sliding between them, while also allowing transversal sliding, without losing the security of coupling in the axial direction.

Seen in this way we can see that thanks to their manufacturing tolerances we achieve the "chain link" effect, i.e. the two parts together form a single element, however, they can be self-centering to a limited extent, with vertical, horizontal and slightly oscillating movements without losing their intrinsic axial connection.

Taking the figure plate and the insert as the critical point of adjustment, the sliding function of the slide assembly in the mold no longer has the high precision requirements of the traditional system and, therefore, what in traditional slides is essential to control in order to achieve the perfect end of the stroke, in this case becomes a simple sliding path.

An advantage of the slide assembly of the present invention is the type of machining and positioning of the figure insert, which, being fully interchangeable due to its design, always maintains perfect centering. This is achieved by means of tapered lateral fits between the insert and the cavity, and flat fits between the cavity and the closure plate.

Thanks to this adjustment design, we achieve a frictionless fit, as the figure insert, during its closing movement, remains slightly raised without rubbing against the sliding surface, and it is at the last moment of the closing of the cavity plate that it is supported by the figure insert, which moves it to the lower plane of the closing plate.

The support of the cavity plate when closing the mold on the figure insert guarantees perfect closing in this part of the mold, as it is this contact that slightly slides the figure insert out of its housing with the slide, until perfect closing is achieved at the end of the closing stroke.

The perpendicular machining between the lateral adjustment cones and the support base are carried out with maximum precision, as they do not require the classic conical machining to avoid the friction caused by the displacement of traditional systems.

The precision required in conventional slides has a high manufacturing cost precisely because of the precision required for its operation, since, as it is a rigid element that must move and fit tightly between the figure insert in each cycle, any small misalignment in the coupling between the two parts can cause burrs in the injected product.

The slide assembly according to the present invention represents a radical change from the concept normally employed, since in addition to requiring fewer components, with the savings that this means, its geometry requires much simpler and easier to apply machining in the mold, with the consequent savings that this represents. Another advantage that will be highly valued by injection molders is that, as it does not require inclined guides to achieve the planned displacements, the cavity plate is free of all the projections that the location of these guides entailed and, therefore, the use of robots to extract parts to achieve the automation of the production system is freed up and greatly simplified.

BRIEF DESCRIPTION OF THE DRAWINGS

In order to complement the description being made and in order to assist in a better understanding of the features of the invention, according to a preferred example of a practical embodiment thereof, a set of drawings is attached hereto as an integral part of the said description, in which the following is illustratively and non-limitingly depicted:

FIG. 1 is a perspective view of the injection mold slide according to the present invention;

FIG. 2 is a sectioned side elevation view with the injection mold slide body according to the present invention;

FIG. 3 is a sectioned side elevation view with the closing wedge of slide for injection molds according to the present invention;

FIGS. 4 to 6 are perspective views showing different positions of the figure insert in relation to the slide body, where it can be seen that the figure insert is vertically and horizontally movable, and is also tiltable.

DESCRIPTION OF A PREFERRED EMBODIMENT OF THE INVENTION

Figure 5:
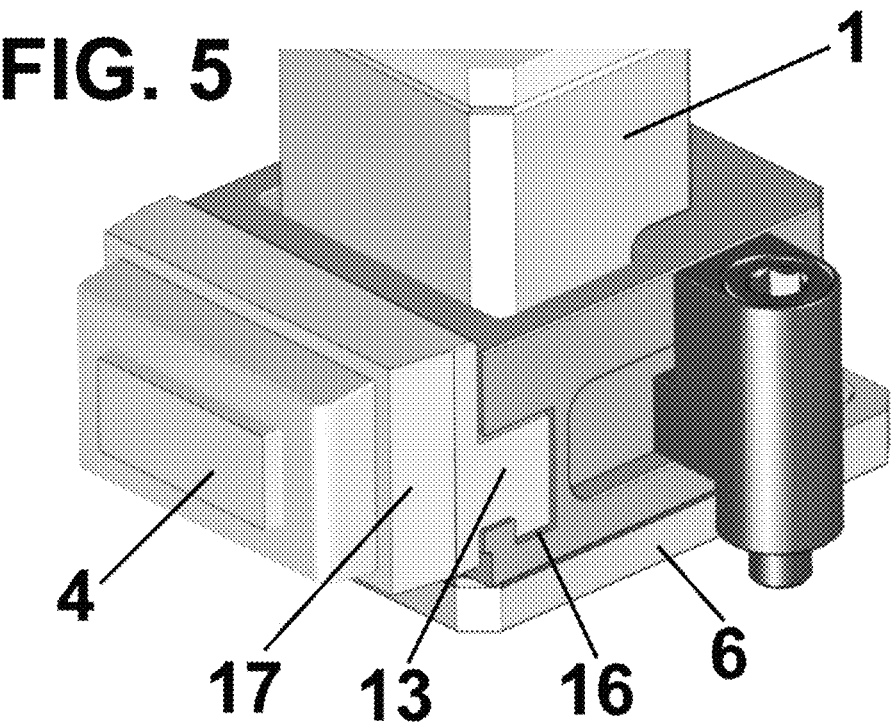

The slide assembly according to the present invention comprises a slide body 5 provided with a hole 51 for housing a closing wedge 1, a figure insert 4 being attached to said slide body 5.

The closing wedge 1 comprises a main portion 14, in a parallelepiped shape, and a protruding portion 15, which is the one that is housed in the hole 51 of the slide body 5. This protruding portion 15 preferably forms an acute angle with the main portion 14, defining inclined surfaces, complementary with inclined surfaces defined by the hole 51.

This slide assembly is designed to perform the function of moving a figure insert 4 attached to the slide body 5 by actuation of the closing wedge 1 when the mold is opened and closed.

The closing wedge 1 is attached to a part of the mold called the injection side by means of a housing adjusted to the dimensions of the closing wedge 1 and a screw 3.

Furthermore, the closing wedge 1 comprises an adjustment plate 2, which is positioned on the closing wedge 1, in particular, on the part of the main portion 14 away from the protruding portion 15, and which allows the height position inside the mold housing to be adjusted to the exact position at the moment of closing the mold.

In this way, the inclined surfaces of the protruding portion 15 of the sealing wedge 1 contact the inclined surfaces of the hole 51 of the slide body 5, causing it to be in exactly the right position so that the figure of figure insert 4 also fits into position with the figure insert of the mold and no leaks appear when the plastic is injected.

The assembly of the slide body 5 and the figure insert 4 moves over a sliding base 6, which is magnetic by means of built-in magnets 8. This makes it possible to keep this sliding base 6 attached to the mold, also during the translation process when the mold is opened and closed.

Furthermore, this sliding base 6 comprises a sliding layer 7 placed between the sliding base 6 and the slide body 5. This sliding layer 7 is made of a low-friction material, e.g. Turcite®, i.e. PTFE (polytetrafluoroethylene) resin with added fillers, e.g. bronze.

This material with a very low friction characteristic prevents wear of the slide body 5 when sliding on the sliding base 6. In addition, the sliding layer 7 has the property that no lubrication is necessary, i.e. it is self-lubricating.

In the sectional view of FIG. 3, it can be seen how the screw 3 passes through the slide body 5 and fixes the closing wedge 1 with the adjustment plate 2. For this purpose, the closing wedge 1 has a threaded hole in the part where it is inserted into the closing wedge 1, which prevents it from coming out freely when it is unscrewed for disassembly. This offers the advantage of not having the possibility of losing it.

Figures 1, 2:
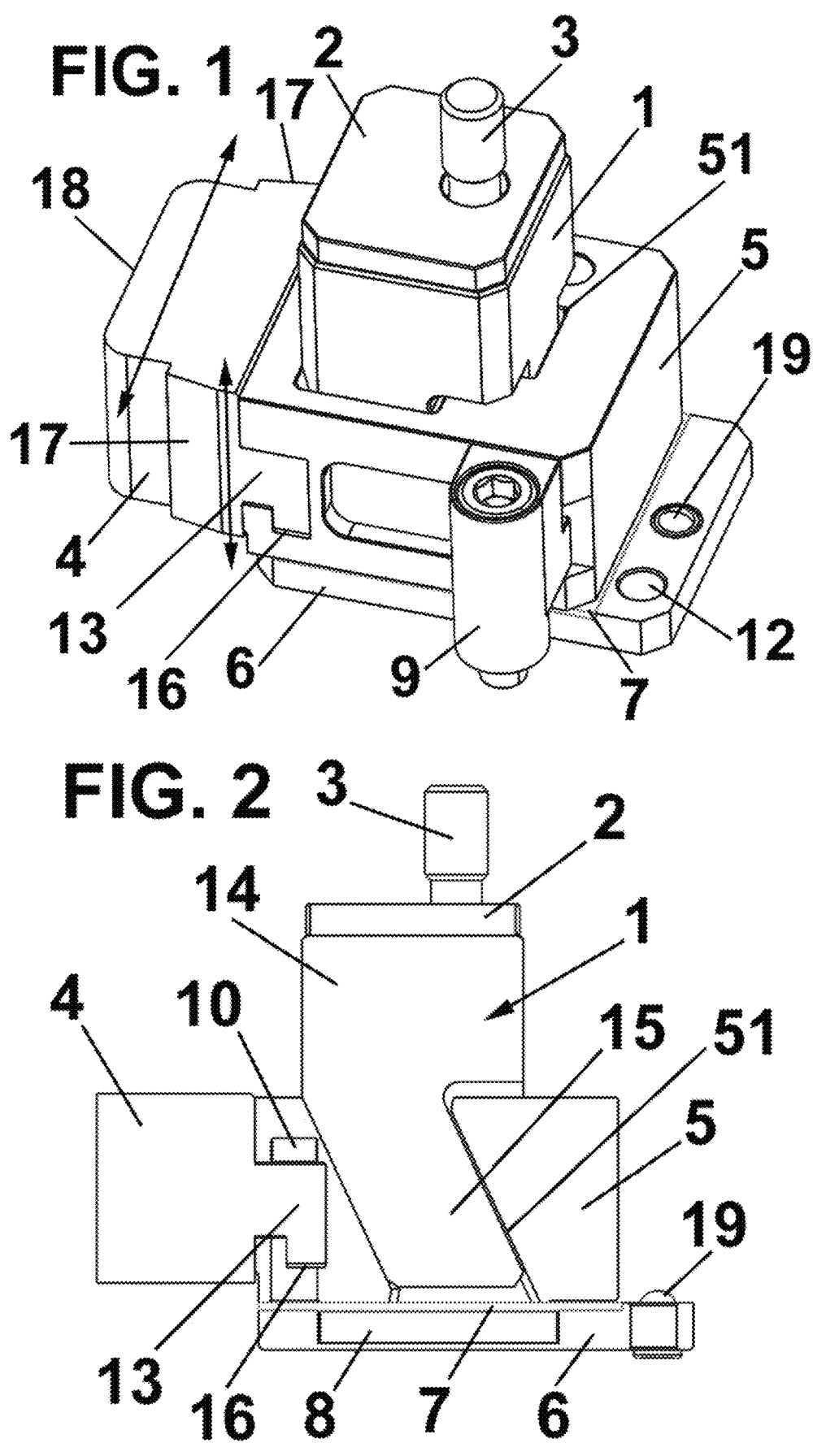

The slide assembly according to the present invention also comprises a slide stop 9, which is shown in FIG. 1. This slide stop 9 has the main function of preventing the slide body 5 from slipping out of the mold in the event that, due to some anomaly during the injection process, the slide assembly becomes incorrectly positioned and the ejection from the mold advances, pushing it towards the outside of the mold and with the risk of causing it to fall.

For this purpose, the slide stop 9 is bolted to the mold and has a flange that acts as a stop.

As noted above, movement of the slide assembly occurs each time the mold is opened and closed. When the mold is closed, the engagement of the components together and their fit with the mold figure inserts ensures that this slide mechanism is not displaced by the injection pressure when the plastic enters the mold cavity.

But when the mold is opened, it is very important that the position of the slide assembly in its open mold position is precise and repeatable in each cycle. For this purpose, the magnetic sliding base 6 enables this function to be fulfilled.

Another technical advantage of the slide assembly of the present invention is the freedom of movement of the figure insert 4 with respect to the slide body 5.

Figure 6:
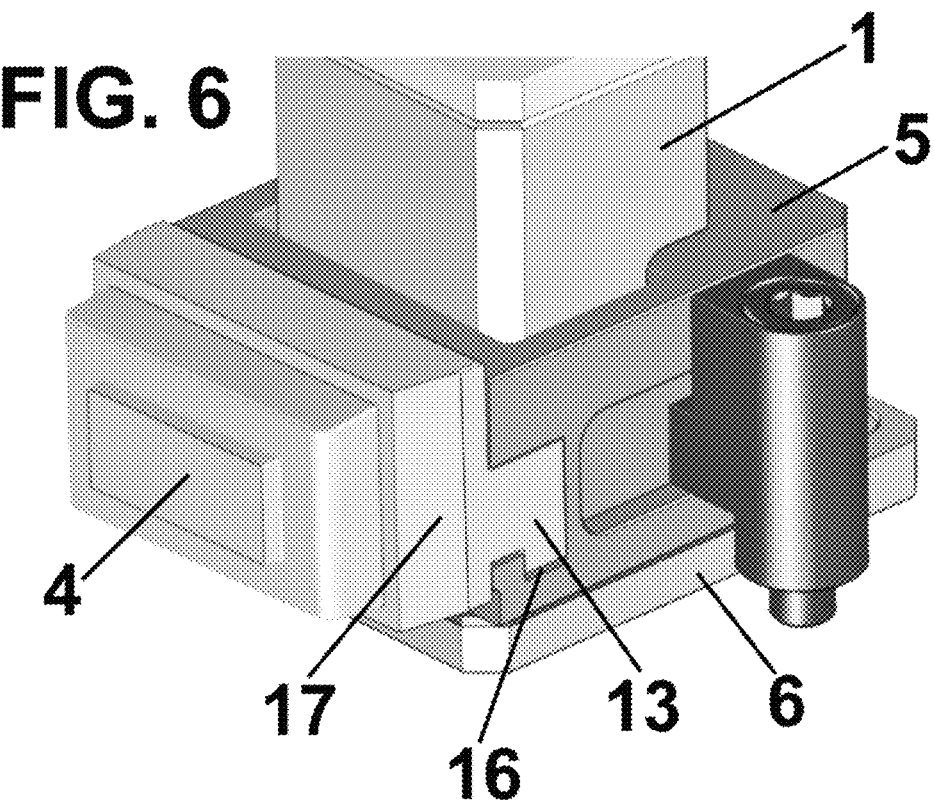

For this purpose, the figure insert 4 comprises an L-shaped projection 13 which is housed in a complementary hole 16 of the slide body 5 with a gap, which allows the figure insert 4 to move vertically and horizontally, and also to tilt. In other words, the slide body 5 can be moved from left to right and up and down and tilted. These movements of the figure insert 4 can be seen in FIGS. 4 to 6, where three positions of the figure insert 4 in relation to the slide body 5 are shown.

Furthermore, the slide body 5 comprises one or more magnets 10, located next to said complementary hole 16. This magnet or magnets 10 cause the figure insert 4 to remain in a certain position thanks to the magnetic attraction thereof, and it is precisely this position which prevents friction between the figure insert 4 and the mold cavity during movements thereof, thus avoiding any possible friction that could generate imperfections and generate burrs in the injected part.

The reason for this freedom of movement is to focus the adjustment of the figure insert 4 of the slide assembly on the figure insert of the mold through a 10° taper lock, which ensures the exact position of the figure insert 4 of the slide assembly. In this way, the slide assembly is freed from the need for precise and exact positioning, as is usually the case with conventional slide assemblies, thus reducing the need for precision machining and, therefore, eliminating the side guides that in conventional slide assemblies allow the slide assembly to maintain positional accuracy for the subsequent adjustment and assembly of the figure insert.

The sliding base 6 also comprises a spring-loaded positioning ball 19 to facilitate positioning of the sliding base 6, and a disassembly hole 12 for easy removal with a spanner, which also serves to unscrew a screw located in the sliding stop 9.

Figure 7:
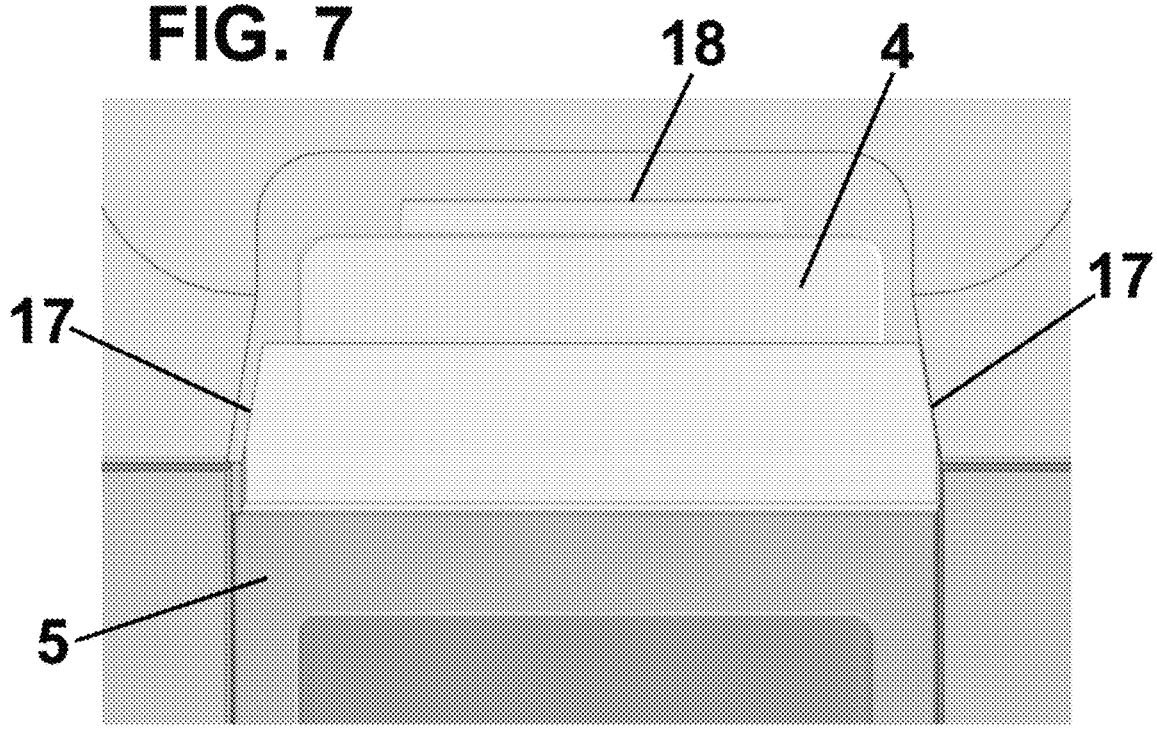
FIGS. 7 and 8 are plan views of the figure insert as it is being inserted into its cavity in the mold.
Figure 8:
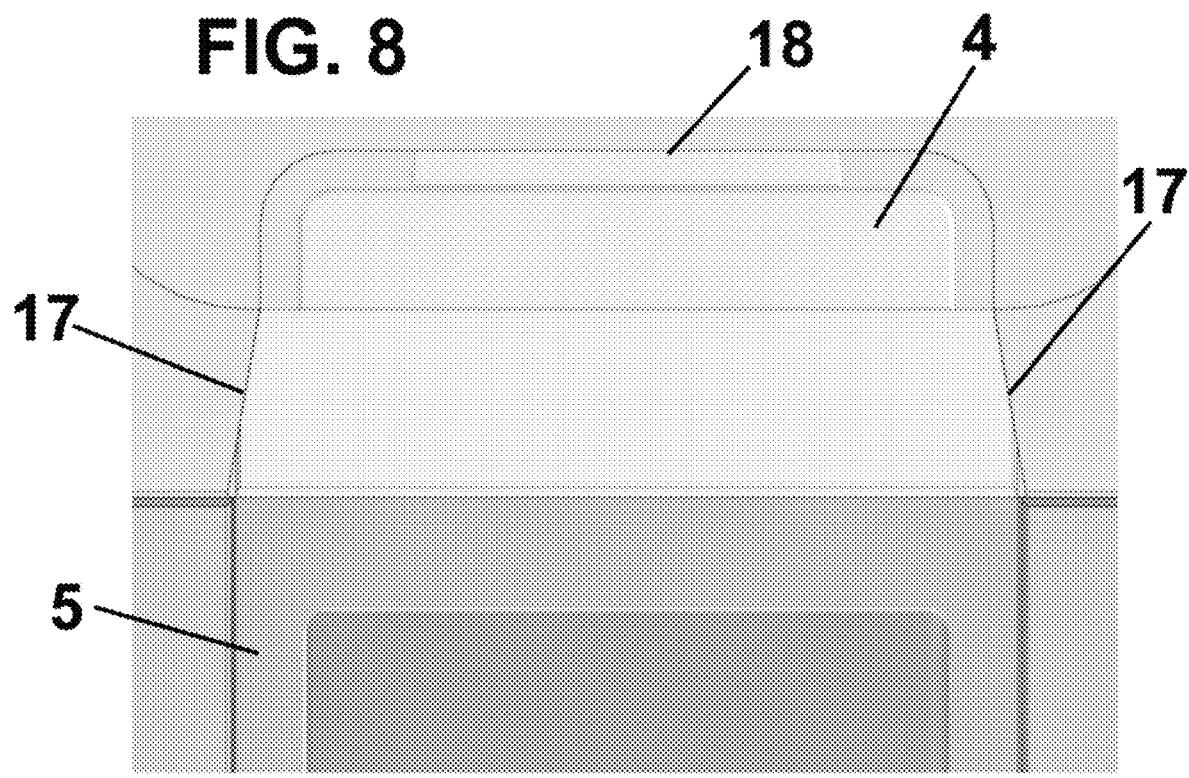

As can be seen in FIG. 1 and in particular FIGS. 7 and 8, the figure insert 4 comprises beveled side portions 17 and a stop surface 18.

In this way, when the figure insert 4 is assembled inside the mold cavity, and due to the tolerances, once they are fitted together, angular sliding between them is allowed, while also allowing transversal sliding, without losing the security of coupling in the axial direction.

Seen in this way we can see that thanks to their manufacturing tolerances we achieve the "chain link" effect, i.e. the two parts together form a single element, however, they can be self-centering to a limited extent, with vertical, horizontal and slightly oscillating movements without losing their intrinsic axial connection.

That is, in the assembly, first a beveled side portion 17 will contact a complementary side wall of the cavity (FIG. 7), allowing transverse displacement to fit snugly inside the cavity, contacting the stop surface 18 with the inside wall of the cavity (FIG. 8).

Although reference has been made to a specific embodiment of the invention, it is obvious to a person skilled in the art that the slide assembly described is susceptible to numerous variations and modifications, and that all the details mentioned can be replaced by technically equivalent ones, without departing from the scope of protection defined by the appended claims.

What is claimed is:

1. A slide assembly for injection molds, comprising:
a closing wedge;
a slide body provided with a hole for housing, at least partially, the closing wedge; and
a figure insert engaged to the slide body,
wherein the figure insert is configured to move vertically and horizontally with respect to the slide body,
wherein the figure insert comprises a projection which is housed in a complementary hole of the slide body,
wherein the slide body comprises at least one magnet located adjacent to said complementary hole.

2. The slide assembly for injection molds according to claim 1, wherein said figure insert is configured to pivot around a horizontal axis, with respect to the slide body.

3. The slide assembly for injection molds according to claim 1, further comprising a sliding base on which the slide body is placed, the slide body sliding on the sliding base.

4. The slide assembly for injection molds according to claim 3, wherein the sliding base is magnetic.

5. The slide assembly for injection molds according to claim 4, wherein the sliding base comprises a sliding layer positioned between the sliding base and the slide body.

6. The slide assembly for injection molds according to claim 5, wherein the sliding layer is made of a polytetrafluoroethylene resin comprising a filler.

7. The slide assembly for injection molds according to claim 3, wherein the sliding base comprises a positioning ball.

8. The slide assembly for injection molds according to claim 3, wherein the sliding base comprises a dismounting hole.

9. The slide assembly for injection molds according to claim 1, wherein the closing wedge comprises a main portion and a protruding portion, which is housed in the hole of the slide body.

10. The slide assembly for injection molds according to claim 9, wherein the protruding portion forms an acute angle with the main portion, defining inclined surfaces, complementary with inclined surfaces defined by the hole.

11. The slide assembly for injection molds according to claim 1, wherein the closing wedge comprises an adjustment plate located at its farthest part from the slide body.

12. The slide assembly for injection molds according to claim 1 further comprising a screw passing through the closing wedge.

13. The slide assembly for injection molds according to claim 1, wherein the figure insert comprises beveled side portions.

* * * * *